Patented May 5, 1953

2,637,622

UNITED STATES PATENT OFFICE 2,637,622

FORMALDEHYDE-DICYANDIAMIDE RESINS AND THE TREATMENT OF LEATHER THEREWITH

William O. Dawson, East Paterson, and Lucien Sellet, Saddle River, N. J., assignors to Jacques Wolf & Co., a corporation of New Jersey No Drawing. Application March 24, 1950, Serial No. 151,818

3 Claims. (Cl. 8—94.21)

This invention relates to the treatment of a penetrable material with dicyandiamide and formaldehyde resin or with guanidine carbonate and formaldehyde resin used as an impregnating material.

This application is a continuation in part of our copending application Serial No. 142,086 filed February 2, 1950, for Treatment of Leather and Like Materials.

This invention is particularly useful in the treatment of tanned leather and will, therefore, be first illustrated by description in connection with the treatment of leather.

Dicyandiamide formaldehyde resins, herein sometimes referred to for convenience as dicy resin, are made as described in our pending application for patent Serial No. 103,953, filed July 9, 1949, for Resinous Material and Method of Making, issued as Patent No. 2,567,238.

The guanidine carbonate and formaldehyde resin is one made in conventional manner, by the interaction of guanidine carbonate with aqueous formaldehyde solution such as the commercial 37% formalin solution. The proportion of the formaldehyde used is also conventional and may be 1, 2, or 3 mols for each mol of actual guanidine in the carbonate, that is, for each half mol of the guanidine carbonate. Additional formaldehyde, if used, presents simply an excess of unnecessary material. The guanidine carbonate used as raw material is the commercial product which contains 2 mols of guanidine to 1 mol of carbonic acid. This commercial carbonate is mixed with the formalin and contact maintained until condensation is substantially complete. This is shown by a usual test for free formaldehyde content; the reaction is considered complete when almost all the added formaldehyde or almost the theoretical quantity, whichever is the less, of the formaldehyde has been combined and there is no further substantial decrease in free formaldehyde content as the contact is continued for a brief period. Preferably we reflux the mixed ingredients for 2 hours or so. The resinous product so made is soluble in water at all dilutions. It is not substantive to chrome tanned leather, leathers tanned with other mineral tanning agents, or other non-ionic and cationic materials to which it may be applied.

These dicy and guanidine resins are useful in treating leather. They not only increase the weight of the product but also give some "bleaching" of the leather and an overall improvement in the "break" of the leather. In this use of either resin, there has been lacking, however, affinity or substantive effect between the resin and the leather, particularly chrome-tanned leather. The result is not only poor extraction of the resin from the treating solution by the leather but also inadequate anchorage of the resin in the leather. We have now discovered a means of bringing into effect a substantive or like action for the resin and fixing the resin in the tanned leather.

Briefly stated, the invention comprises the treatment of a penetrable material, chrome-tanned leather being an example, with a surface active anionic agent and the dicy resin or the guanidine carbonate and formaldehyde resin. It comprises also the reaction product of the said agent and resin. In the preferred embodiment, the anionic agent is introduced first into the penetrable material and the resin later. The result is the desired substantive effect or bonding of the resin to the material. The invention comprises also the insoluble reaction product of the said agent and the selected resin.

We have discovered that the dicy resin and the guanidine carbonate and formaldehyde resin are themselves cation active. We consider that our anionic agent modifies or reacts with the amino groups or other features of the leather in such manner as to make the leather and resins show a substantive effect towards each other. The anionic agent also forms an insoluble addition compound with the resins, as may be shown by precipitation when solutions of the agent and the resins separately are mixed in a test tube.

As to materials used, we find particularly satisfactory results with the chrome-tanned leather. Our method is applicable, however, to the treatment of other materials which, by themselves, do not fix the resin introduced into them, that is, are non-substantive or lack affinity for the resin. Examples of such other materials that may be treated according to our invention are leather that has been tanned with alum, zirconium sulfate or other metal salt tanning agents; fabrics or fibers of wool, silk or acetate rayon; and felt.

The anionic agent used is one that contains a sulfo group ($\cdot SO_3H$) and as used is soluble in water. The sulfo group may be in a free sulfonic acid, a water soluble salt thereof, or an ester, as in compounds of the type $RO \cdot SO_3H$, R being an alkyl or an arylalkyl group. For use with leather, the anionic agent must have a definite affinity for the material being treated, that is, must itself be substantive so that it is separated by the material being treated from the water solution in which the agent is applied; in the case of penetrable materials to be treated that do not possess direct affinity for anionic agents as specified, the materials are first impregnated with an anionic agent, followed by subsequent treatment with the resin, in order to form in the material the insoluble reaction product of the anionic agent and resin.

Examples of anionic agents meeting these requirements that we use to advantage in fixing the resin are naphthalene sulfonic acid and formaldehyde condensation products, sulfonated phenolformaldehyde condensation products, the condensation product of sulfonated phenol and formaldehyde, sulfonated product of dihydroxydiphenyl sulfone or of dihydroxydiphenyl propane, preferably in the form of the omega sulfonation, sulfonated dihydroxydiphenyl methane, phenolic derivatives possessing a urea-formaldehyde-condensation bridge or other resin intermediates as a bridge formation, and sulfite lignin containing reactive sulfo groups which will react and form an insoluble compound with the dicy and guanidine resin. Illustrative sulfonated oils that meet the requirements stated and that may be used are sulfonated castor, neatsfoot, teaseed, and the like. Other anionic agents that may be used are sulfonated alcohols such as sulfonated cetyl, lauryl, and stearyl; these are more stable in the form of their salts. We use them preferably in the form of the sodium salts. In general, we may use the acid sulfo compounds such as illustrated above or their more stable salts such as those of sodium or ammonium. All of these agents are precipitants for our resin in aqueous solution. They may be the original sulfo tanning agents.

The dicy resin or the quanidine carbonate and formaldehyde resin used is the water soluble (infinitely dilutable without precipitation) product such as that made and described in our said copending application or above. The dicy resin is made by forming an aqueous solution of dicyandiamide and formaldehyde in the proportion of 3.6–5 mols of formaldehyde to 1 mol of dicyandiamide, heating the mixture at a pH above 7, maintaining the total free and reacted formaldehyde during the heating step in the proportion of 3.6 to 5 mols, continuing the heating until the condensation product formed becomes insoluble in water on extreme dilution and then later becomes soluble on such dilution, and then discontinuing the heating when the water soluble stage is reached.

In general the method of treatment is as follows: The material to be treated, ordinarily in wet condition, is impregnated with an aqueous solution of the anionic agent, as for example, any one of those given above. The excess of the solution of the agent is then drained away and the product is rinsed to remove any uncombined anion active compound or salts. Then an aqueous solution of either of the resins described is applied. The leather or other material is then given its usual finishing treatment such as washing at elevated temperatures for the proper application of fat liquoring materials and pigments.

For best commercial results we use the anionic agent in proportion of 1 to 10 parts and the resin in proportion within the same range, these proportions being expressed as parts by weight for 100 parts of the shaved weight of the leather, that is, on the wet basis. Ordinarily we use the same proportion of the said agent and resin.

The anionic agent and the resin may be added either wet or dry. The leather itself is wet at the stage when the addition is made; as a result, the agent or resin, if dry, dissolves in the water present in the leather treating bath.

As to temperature of treatment, the temperature of the water in the bath, when the anionic agent and resin are added dry, should be at least as high as the temperature at which these materials will dissolve readily in water. Examples of such temperatures are 80° to 140° F. for solution of the anionic agent and 130° to 150° F. for dissolving the resin. In all cases the temperature must be below that causing a deleterious effect upon the leather itself.

We find desirable the use of about 30 minutes for the penetration of the anion active agent and about 45 minutes for the contact of the resin with the leather before the next step in the treatment is undertaken.

The invention will be illustrated in greater detail by description in connection with the following specific examples of the practice of it.

*Example 1*

100 pounds chrome-tanned leather is split and shaved to the desired weight, washed with water for 10 minutes at 110° to 120° F. and then drained. Water in the proportion of 80% of the shaved weight is then put on the leather at 110° to 120° F. There is next applied a solution of the sodium salt of dinaphthyl methane disulfonic acid in the proportion of 3 parts of the actual salt. This salt is an example of a salt of naphthalene sulfonic acid and formaldehyde condensation product, an anionic agent.

After the salt is added, the whole is tumbled in a rotating drum for 30 minutes, washed 5 minutes at 140° F., and drained. 80% by weight of water is again put on the leather at 140° F. and there is then applied the dicy resin, in dry powdered form, in amount equal to 3% of the shaved weight of the leather. The whole is tumbled in a drum for 45 minutes.

Then the conventional fat liquoring is effected as follows: Wash 10 minutes at 120° F., drain, put on 4% of white pigments and 3 to 4% of sulfated oils in 80% of water at 120° F., and drum (tumble) 30 minutes.

All proportions are expressed as percentages of the shaved weight of the leather.

The use of the dicy resin and the anionic agent results in an increased weight or thickness of the leather, a definite improvement in the whitening or bleaching action, and a finer and improved overall "break" to the leather. By "break" we mean the resistance of the leather to sharp creasing and attendant separation of fibers when the leather is bent.

*Example 2*

The procedure of the general method stated above or of the specific Example 1 is followed except that the chrome-tanned leather is treated with the solution of the dicyandiamide-formaldehyde resin in advance of the application of the anionic agent. Then the anionic agent of Example 1 is introduced and the treated leather finished as described.

*Example 3*

In place of the naphthalene sulfonic acid and formaldehyde condensation product used in Examples 1 or 2 above, we use an equal proportion by weight of any of the other anionic agents listed above. The procedure is otherwise exactly as stated under Examples 1 or 2.

*Example 4*

A woven wool fabric is passed through a bath consisting of an aqueous solution of sulfonated cetyl alcohol in concentration 5 parts to 100 parts of water and then through a like bath containing the dicy resin in water in the same concentration. The thus treated cloth, containing an insoluble precipitate of the resin and the sulfonated alcohol, is then washed and dried in usual manner.

*Example 5*

Into a beater charge of sulfite wood pulp there is introduced 5 parts by weight of any one of the anionic agents described above for 100 parts dry weight of the pulp. There is then introduced an equal proportion of dicy resin in aqueous solution, the whole charge being stirred by the usual beater action during the addition of the resin solution. The thus treated fibers are then formed into paper, as on a Fourdrinier wire, and dried and finished in usual manner.

*Example 6*

The procedure of Example 4 is followed except that the sulfonated cetyl alcohol there used is replaced by an equal weight of any of the other surface active anionic agents described above.

*Example 7*

The procedure of Examples 1 to 6 is followed exactly except that the dicy resin therein is replaced in each example by the guanidine carbonate and formaldehyde resin in amount equal to the dicy resin replaced.

The cloth and paper treated as described with either of the resins have desirable properties. They have increased body or feel, increased strength and decreased rate of absorption of moisture to which they may be exposed in use.

It will be understood that it is intended to cover all changes and modifications of the examples of the invention herein chosen for the purpose of illustration which do not constitute departures from the spirit and scope of the invention.

What we claim is:

1. The water insoluble reaction product of a water soluble resinous condensation product of formaldehyde and dicyandiamide with an anionic water soluble compound selected from the group consisting of organic sulfonic acids and their salts and esters, the said resinous condensation product being the product of forming a mixture of dicyandiamide and an aqueous solution of formaldehyde in the proportion of 3.6 to 5 mols of formaldehyde to 1 mol of the dicyandiamide, heating the mixture at a pH above 7, maintaining the total free and reacted formaldehyde during the heating step in the proportion of 3.6 to 5 mols, continuing the heating until the condensation product formed becomes insoluble in water on extreme dilution and then later becomes soluble on such dilution, and then discontinuing the heating when the water soluble stage is reached.

2. The water insoluble reaction product of claim 1 in which the said anionic water soluble compound is the water soluble naphthalene sulfonic acid and formaldehyde condensation product.

3. In treating leather with the water soluble resinous condensation product of claim 1 and the said anionic water soluble compound of claim 1, the method which comprises introducing into the leather one of these two materials and then introducing the other one of them so that the water insoluble reaction product of claim 1 is formed in situ in the leather.

WILLIAM O. DAWSON.
LUCIEN SELLET.

References Cited in the file of this patent

UNITED STATES PATENTS

| Number | Name | Date |
| --- | --- | --- |
| 1,947,513 | Bergmann | Feb. 20, 1934 |
| 2,191,818 | Stiasny | Feb. 27, 1940 |
| 2,205,355 | Grimm et al. | June 18, 1940 |
| 2,224,293 | Finlayson | Dec. 10, 1940 |
| 2,246,070 | Schlack | June 17, 1941 |
| 2,303,209 | Grim | Nov. 24, 1942 |
| 2,350,894 | Honel | June 6, 1944 |
| 2,353,556 | Grim et al. | July 11, 1944 |
| 2,444,802 | Auten et al. | July 6, 1948 |
| 2,490,958 | Graenacher | Dec. 13, 1949 |
| 2,516,283 | Winheim et al. | July 25, 1950 |